(12) United States Patent
Feger et al.

(10) Patent No.: US 7,143,598 B2
(45) Date of Patent: Dec. 5, 2006

(54) ENERGY SYSTEM MAKING USE OF A THERMOELECTRIC POWER UNIT AND NATURAL GAS STORED IN LIQUID FORM

(75) Inventors: Damien Feger, Vernon (FR); Lionel Julliand, Beaucourt (FR); Abdallah Mirzaian Dehkordi, Valdoie (FR)

(73) Assignees: SNECMA, Paris (FR); Converteam SAS, Massy (FR)

( * ) Notice: Subject to any disclaimer, the term of this patent is extended or adjusted under 35 U.S.C. 154(b) by 0 days.

(21) Appl. No.: 11/257,494

(22) Filed: Oct. 24, 2005

(65) Prior Publication Data
US 2006/0225448 A1 Oct. 12, 2006

(30) Foreign Application Priority Data
Oct. 25, 2004 (FR) .................... 04 11328

(51) Int. Cl.
*F25B 27/00* (2006.01)
(52) U.S. Cl. ..................... 62/238.6; 62/3.3
(58) Field of Classification Search .............. 62/3.2, 62/3.3, 286.6; 237/12.1; 165/104.21
See application file for complete search history.

(56) References Cited

U.S. PATENT DOCUMENTS

| 4,574,710 A | * | 3/1986 | Pickard | ............... | 110/234 |
| 6,053,418 A | * | 4/2000 | Guyer | ............... | 237/12.1 |

FOREIGN PATENT DOCUMENTS

JP 57 167597 10/1982

* cited by examiner

*Primary Examiner*—Melvin Jones
(74) *Attorney, Agent, or Firm*—Weingarten, Schurgin, Gagnebin & Lebovici LLP (57) ABSTRACT

The invention relates to an energy system using as fuel natural gas stored in liquid form in at least one tank containing liquefied natural gas, the system comprising a feeder device provided with a heater device for heating liquefied natural gas and/or natural gas vapor, and making use of a thermoelectric power unit including rotary electrical machines, the system further comprises a first heat exchanger system associated with a cooler device for cooling the rotary electrical machines, and a second heat exchanger system associated with the heater device, the first heat exchanger system being coupled to the second heat exchanger in order to enable heat to be transferred from the cooler device to the heater device.

15 Claims, 5 Drawing Sheets

ENERGY SYSTEM MAKING USE OF A THERMOELECTRIC POWER UNIT AND NATURAL GAS STORED IN LIQUID FORM

This application claims priority to a French application No. 04 11328 filed Oct. 25, 2004.

FIELD OF THE INVENTION

The present invention relates to the general field of supplying energy to thermoelectric power units that include rotary electrical machines, and it relates more particularly to an energy system for cooling rotary electrical machines in a ship or a system for producing electricity.

BACKGROUND OF THE INVENTION

Electrically-propelled ships, in particular methane tankers, are known that make use of natural gas stored in liquid form as fuel.

With ships of this type, natural gas is transported in liquid form at atmospheric pressure, at a temperature of about −160° C. Although the tanks containing the cargo are thermally insulated, a fraction of the cargo evaporates on a continuous basis, typically 0.1% to 0.3% per day, due to heat passing through the insulation.

While the ship is under way, the corresponding natural gas vapor is advantageously used as fuel for providing at least part of its propulsion. Until recently, such methane tankers have been steam-propelled. The boiler delivering the steam was fitted both with burners operating on natural gas and with burners operating on heavy fuel. Depending on the energy requirements of the ship, and on the rate at which natural gas vapor is being given off by the cargo, steam production can be adjusted by using power delivered by the heavy fuel burners, in addition to the power delivered by the natural gas vapor.

That combined type of propulsion also has the advantage, whenever the energy requirements of the ship are less than the power being supplied by the boiler, of enabling excess vapor to be exhausted directly to a condenser instead of to the propulsion system of the ship, as can happen during waiting stages or when steaming slowly.

That type of propulsion nevertheless presents numerous drawbacks, and in particular:

lower efficiency than propulsion systems based on diesel oil, gas turbines, or even diesel with heavy fuel;

a machine room of large size, correspondingly reducing the volume available for cargo in a hull of given size; and propulsion based on technology that is relatively unusual, which can lead to difficulties in maintenance and in training crew.

That type of propulsion is therefore presently in competition with techniques based on using diesel engines or gas turbines, coupled to devices that serve to burn off or to reliquefy the natural gas vapor given off by the cargo whenever the energy requirements of the ship do not enable the vapor to be absorbed. Both engines and turbines can make use either of natural gas or else of fuel oil as fuel for driving electricity generators that are used in turn, amongst other things, to power one or more propulsion motors.

When the available natural gas vapor is insufficient for providing the heat energy requirements of the ship, instead of taking additional energy from fuel oil, it can be taken from the liquefied natural gas which is pumped directly from the tanks while in the liquid state, and then vaporized.

Both natural gas vapor and liquefied natural gas are taken from the tanks at temperatures that are too cold (respectively about −130° C. and −160° C.) and at a pressure that is too low to be directly usable by the ship's propulsion system. It is therefore necessary to raise them to a temperature close to ambient and to compress them to a pressure of a few bars before using them.

Figure 5:
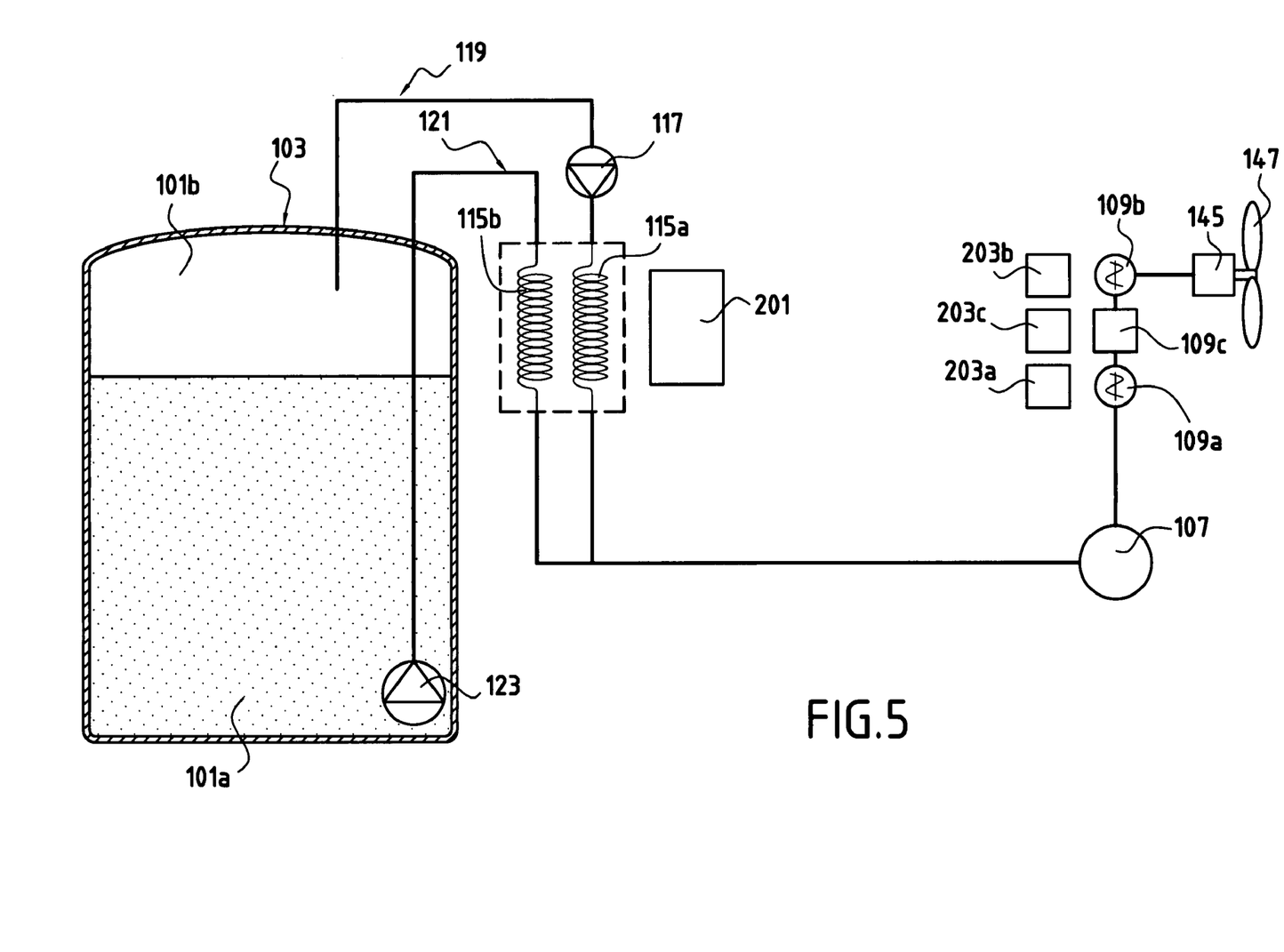
FIG. 5 is a highly diagrammatic view of an energy system in a prior art ship.

FIG. 5 is highly diagrammatic and shows a prior art electrical propulsion system for a methane tanker.

The system comprises a first circuit 119 for taking the natural gas vapor 101b that is given off by the tanks 103. The natural gas vapor 101b is directed to one or more compressors 117 and then to a heating heat exchanger 115a for bringing the vapor to a pressure and a temperature that are compatible with the engines 107 of the ship's propulsion system.

In order to provide additional energy that might be needed to meet the requirements of the ship, the system includes a second circuit 121 for taking liquefied natural gas 101a, the second circuit comprising one or more pumps 123 immersed in one or more liquefied natural gas tanks 101a, and another heating heat exchanger 115b for raising the liquefied gas 105a to a temperature and pressure that are compatible with the engines 107.

The heat exchangers 115a and 115b are fed with heat from a heat source 201 (steam or electricity), thus enabling the natural gas vapor 101b and the liquefied natural gas 101a to be heated.

The ship's propulsion system comprises one or more electric motors 109b fed via power electronics 109c and driving one or more propellers 147 either directly, or via a coupler, or via a speed-reducing gearbox 145.

In addition, the motors 109b, alternators 109a, and power electronics 109c are all cooled by cooling systems 203b, 203a, and 203c using air or water.

Nevertheless, the energy efficiency of that electrical propulsion system is not very high.

OBJECT AND SUMMARY OF THE INVENTION

The present invention thus seeks to improve the efficiency of an energy system including a thermoelectric power unit and making use of natural gas stored in liquid form.

Another object is to reduce the overall size of the system while improving reliability and safety.

Other object is to facilitate maintenance and to reduce costs.

These objects are achieved by an energy system using as fuel natural gas stored in liquid form in at least one tank containing liquefied natural gas, the system comprising a feeder device provided with a heater device for heating liquefied natural gas and/or natural gas vapor, and making use of a thermoelectric power unit including rotary electrical machines, the system further comprising a first heat exchanger system associated with a cooler device for cooling the rotary electrical machines, and a second heat exchanger system associated with the heater device, the first heat exchanger system being coupled to the second heat exchanger in order to enable heat to be transferred from the cooler device to the heater device.

Thus, by taking a fraction of the heat sink available in the natural gas vapor given off by the tank(s) and in the liquefied natural gas taken from said tank(s) for the purpose of reducing the operating temperature of the electric propulsion motors and of the other electrical components, it is possible to improve efficiency very significantly and, amongst other things, to reduce costs and bulk.

In addition, the invention makes it possible to improve significantly the energy budget of the system by using heat losses from the components of the rotary electrical machines to regasify or to heat the natural gas.

Advantageously, each of the first and second heat exchanger systems comprises a plurality of heat exchangers.

The coupling between the first heat exchanger system and the second heat exchanger system is constituted by at least one heat transfer circuit containing a two-phase refrigerant.

Preferably, the first heat exchanger system is an evaporator system and the second heat exchanger system is a condenser system, such that the refrigerant presents a gas phase in the first heat exchanger system and a liquid phase in the second heat exchanger system, thus causing the refrigerant to circulate in said at least one heat transfer circuit, merely under the effect of gravity.

The refrigerant comprises a fluid selected from argon, nitrogen, or any other fluid that is condensable by liquefied natural gas vapor, the fluid being used pure or in the form of a mixture.

According to a feature of the invention, said at least one heat transfer circuit includes at least one flow rate regulator member.

According to another feature of the invention, said at least one heat transfer circuit includes at least one additional heat exchanger associated with an auxiliary source of heat.

In one aspect of the invention, the feeder device comprises a first circuit for taking natural gas vapor that is given off by said at least one tank of liquefied natural gas, said first circuit comprising at least one compressor and at least one first heating heat exchanger associated with the second heat exchanger system.

In another aspect of the invention, the feeder device further comprises a second circuit for taking liquefied natural gas, the second circuit comprising at least one pump immersed in said at least one tank of liquefied natural gas, and at least one second heating heat exchanger associated with the second heat exchanger system.

According to yet another feature of the invention, the cooler device includes an air-conditioning unit.

The invention also provides in particular a ship including an energy system having the above-specified characteristics, and in which natural gas is used as fuel for the thermoelectric power units for propelling the ship.

Advantageously, the feeder device is installed in a cargo area on the deck of the ship at a determined safety distance from the superstructure of the ship, and the thermoelectric power units is installed in a machine room.

In particular, the ship is a methane tanker transporting liquefied natural gas and using it as fuel.

The invention also provides an electricity production system comprising an energy system having the above characteristics, and in which the rotary electrical machines comprise alternators for producing electricity.

In particular, the invention can be applied to a terminal for regasifying liquefied natural gas, where the heat sink made available during the process of regasifying the liquefied natural gas can be used for cooling the electricity generators or alternators providing the terminal with electrical power.

BRIEF DESCRIPTION OF THE DRAWINGS

Other features and advantages of the method and the apparatus of the invention appear on reading the following description given by way of non-limiting indication and with reference to the accompanying drawings, in which.

DETAILED DESCRIPTION OF EMBODIMENTS

Figure 1:
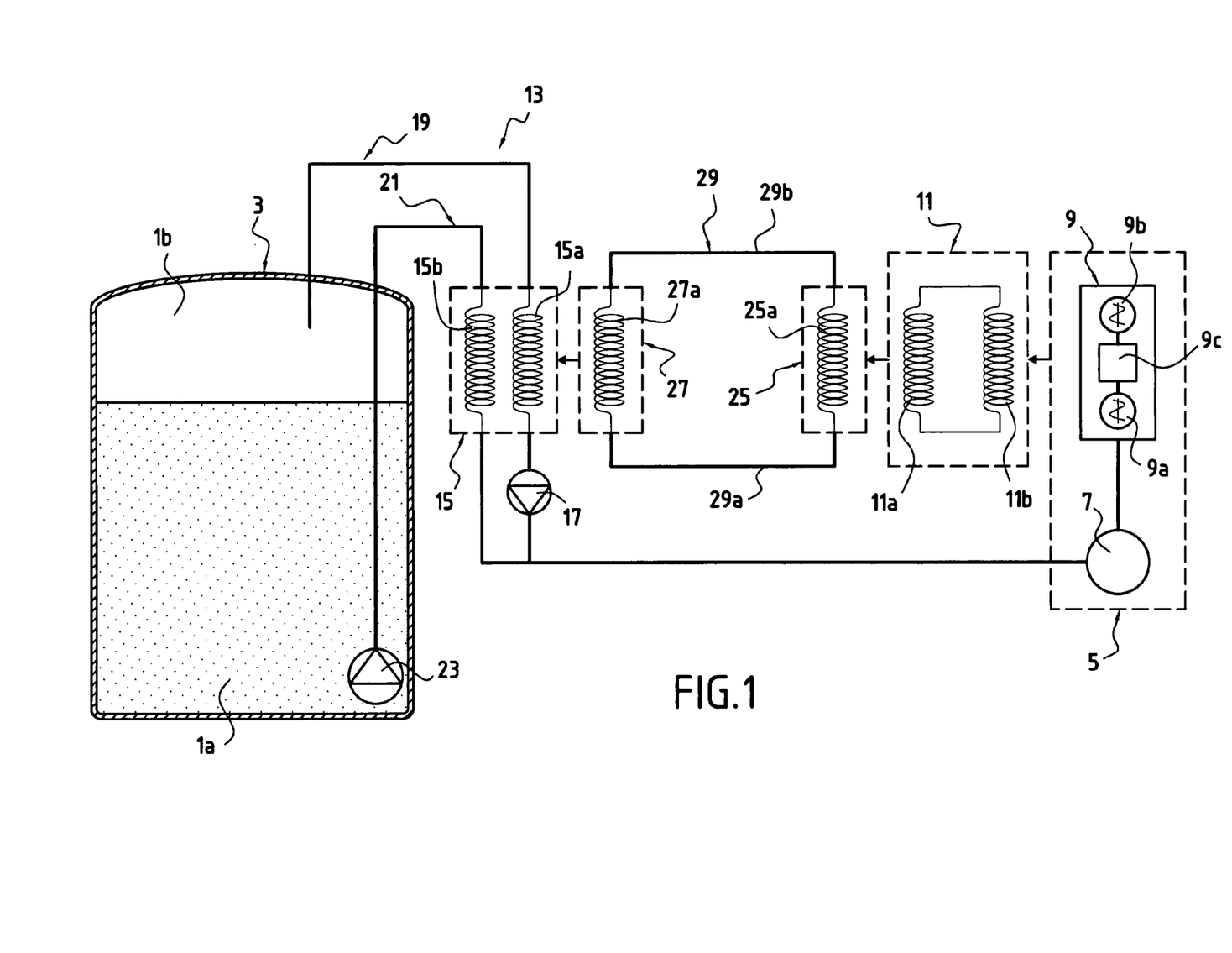
FIG. 1 is a highly diagrammatic view of an energy system making use of natural gas stored in liquid form and comprising a first heat exchanger associated with a cooler device and a second heat exchanger associated with a heater device in accordance with the invention.

FIG. 1 is a highly diagrammatic view of an energy system making use of natural gas $1a$, $1b$ stored in liquid form in one or more tanks 3 (only one tank shown), together with thermoelectric power units 5 and comprising engines 7 and rotary electrical machines 9.

The rotary electrical machines 9 may comprise alternators $9a$ and electric motors $9b$ powered via power electronics $9c$.

These rotary electrical machines 9 are cooled by a cooler device 11 which may comprise, in conventional manner, a circuit fitted with heat exchangers $11a$ and $11b$. The cooler device 11 thus ensures that the alternators $9a$, electric motors $9b$, and power electronics $9c$ operate properly.

Figure 3:
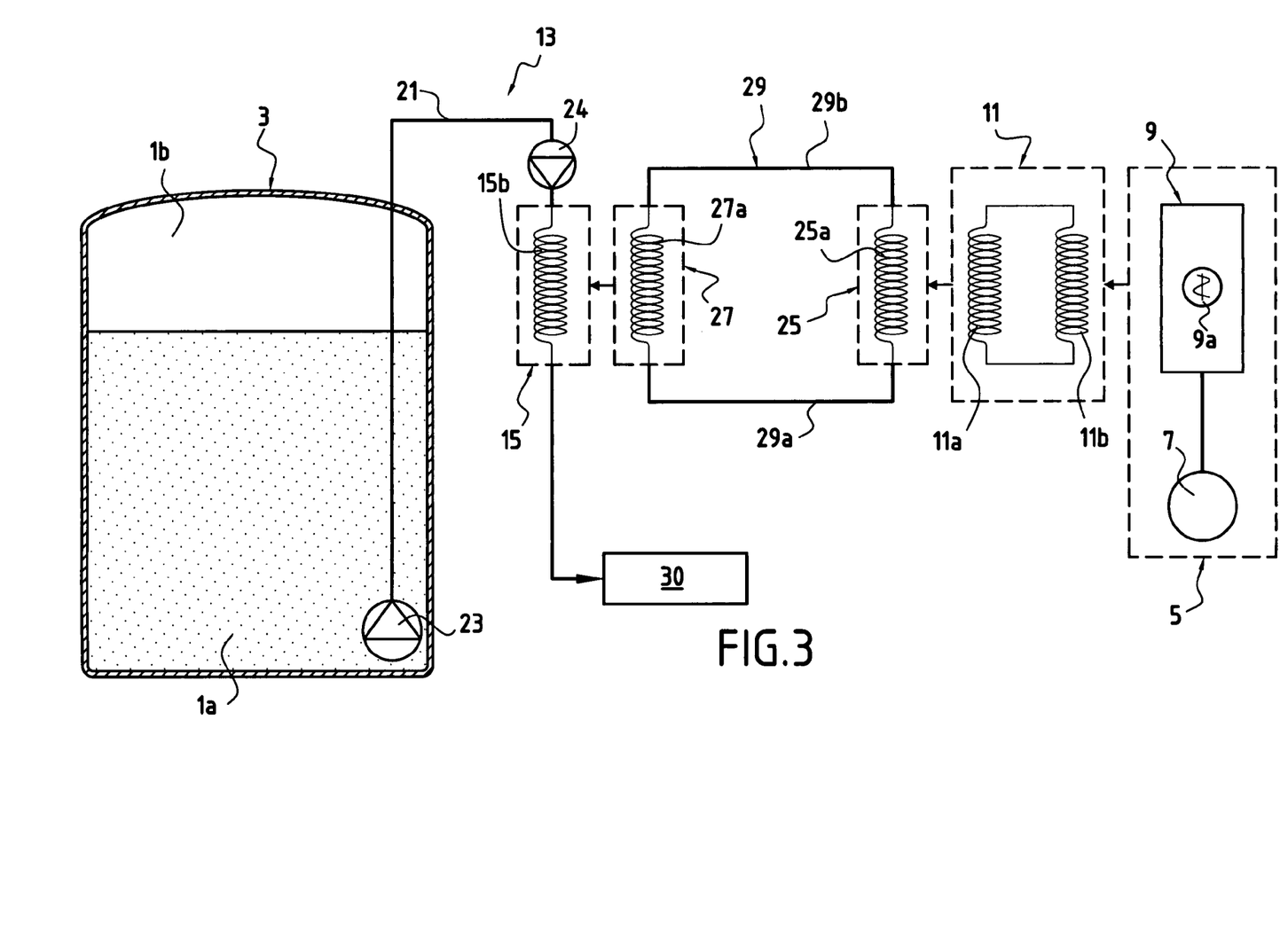
FIG. 3 is a highly diagrammatic view of a regasification terminal feeding a gas pipeline and including an energy system of the invention.

In addition, the energy system includes a feeder device 13 for taking and processing liquefied natural gas $1a$ and/or natural gas vapor $1b$ for feeding to the engines 7 in the thermoelectric power units 5 (FIG. 1), or possibly for feeding to a gas pipeline (see FIG. 3).

To this end, the feeder device 13 is provided with a heater device 15 having one or more heat exchangers $15a$, $15b$ for heating the liquefied natural gas $1a$ and/or the natural gas vapor $1b$ to a temperature that is close to ambient, and possibly one or more compressors 17 for compressing the natural gas vapor $1b$.

The feeder device 13 then comprises a first circuit 19 for taking the natural gas vapor $1b$ that is given off by the tank(s) 3 containing liquefied natural gas $1a$. This first circuit 19 comprises at least one compressor 17 and a first heating heat exchanger $15a$.

Furthermore, in order to provide any additional energy that might be needed to cover the requirements of the thermoelectric power units 5, the feeder device 13 may include a second circuit 21 for taking liquefied natural gas $1a$. This second circuit 21 comprises at least one pump 23 immersed in the tank 3 containing liquefied natural gas $1a$ and a second heating heat exchanger $15b$.

In addition, and in accordance with the invention, the energy system comprises a first heat exchanger 25 associated with the device 11 for cooling the rotary electrical machines 9, and a second heat exchanger system 27 associated with the device 15 for heating the liquefied natural gas $1a$ and/or the natural gas vapor $1b$ that is fed to the thermoelectric power units 5.

The first heat exchanger system 25 may comprise one or more heat exchangers $25a$. Similarly, the second heat exchanger 27 may comprise one or more heat exchangers $27a$. It should be observed that for simplification purposes, the drawing shows only one heat exchanger $25a$, $27a$ in each of the first and second heat exchanger systems 25, 27.

The first heat exchanger system 25 is coupled to the second heat exchanger system 27 in order to allow heat energy (represented in the drawings by arrows) to be transferred from the cooler device 11 to the heater device 15. Thus, a fraction of the heat sink available in the natural gas vapor 1b given off by the tank 3 and in the liquefied natural gas 1a taken from said tank 3 is used to lower the operating temperature of the rotary electrical machine 9 or to enable said machines to be cooled more effectively.

The coupling between the first heat exchanger system 25 and the second heat exchanger system 27 is implemented via ducts 29a, 29b forming at least one heat transfer circuit 29 conveying a cooling fluid.

The heat transfer circuit 29 forms a loop enabling heat to be transferred both to the cold natural gas vapor 1b fed by the first circuit 19 to the first heating heat exchanger 15a, and also to the liquefied natural gas 1a taken from the tank 3 by the second circuit 21 via the second heating heat exchanger 15b.

This heat transfer loop or circuit 29 contains a cooling fluid whose composition can be optimized as a function of the required thermal performance, in particular as a function of the operating temperatures of the first and second heat exchanger systems 25 and 27.

Figure 2:
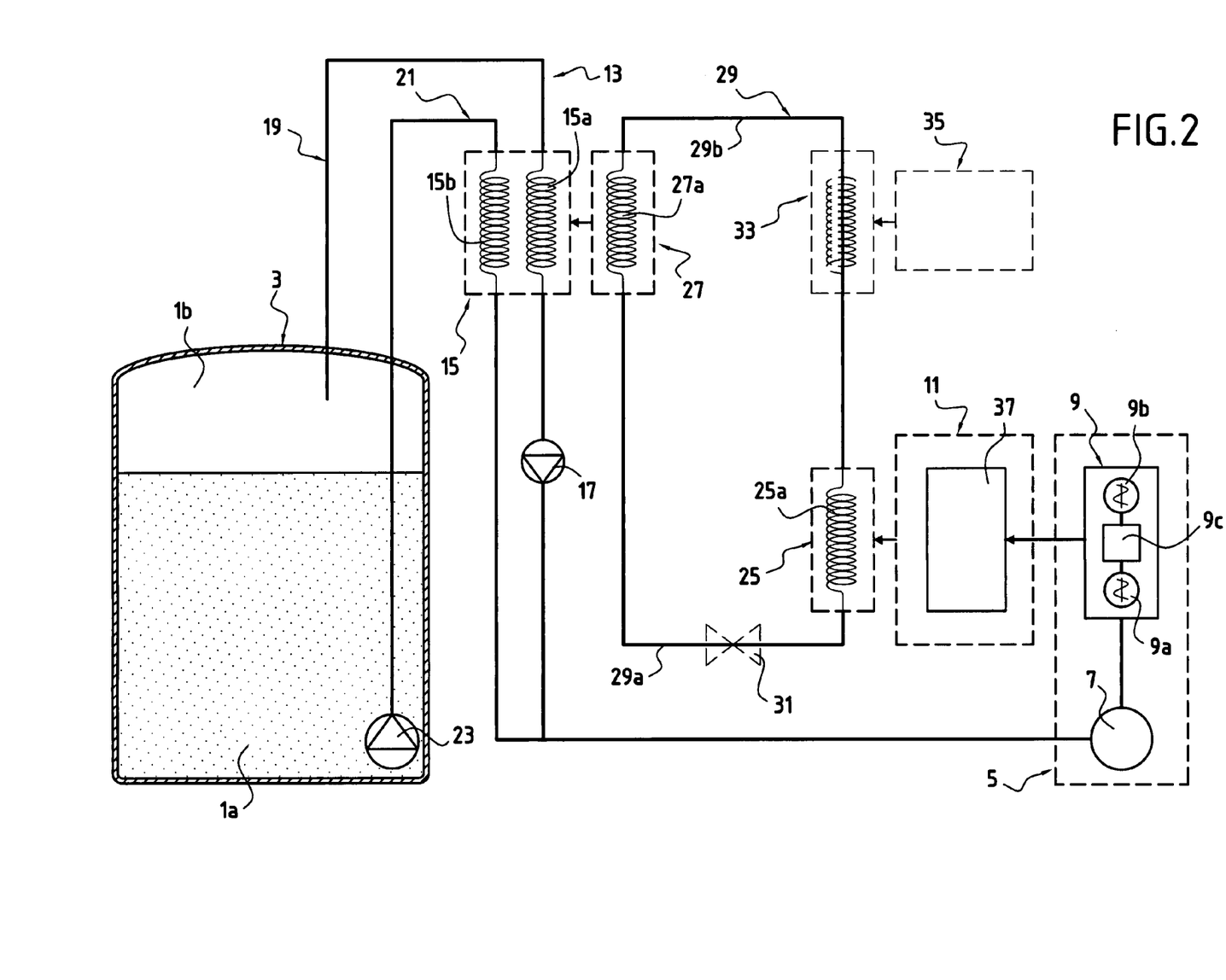
FIG. 2 shows a variant of FIG. 1 in which the first heat exchanger system is disposed at a lower level than the second heat exchanger system.

FIG. 2 is a highly diagrammatic view of an energy system that differs from that of FIG. 1 essentially by the fact that the first heat exchanger system 25 is located at a level that is lower down than that of the second heat exchanger system 27. This provides a gravity pump for the cooling fluid, due to the density difference between the cooling fluid flowing through the first heat exchanger system 25 and the fluid flowing through the second heat exchanger 27, with the first system 25 being at a higher temperature than the second system 27.

Advantageously, the cooling fluid is a two-phase fluid, e.g. argon, nitrogen, or any other refrigerant that can be condensed by liquefied natural gas vapor (e.g. a hydrocarbon), used pure or in the form of a mixture. A change of phase in the cooling fluid in one or the other of the first and second heat exchangers 25, 27 enables the performance of the heat transfer circuit 29 to be improved and enables the size and the cost of the elements making it up to be reduced.

In particular, the first heat exchanger system 25 may be an evaporator system and the second heat exchanger system 27 may be a condenser system for the refrigerant. Thus, the refrigerant presents a gas phase in the first heat exchanger system 25 and a liquid phase in the second heat exchanger system 27, further improving circulation thereof around the heat transfer circuit 29 merely under the effect of gravity.

It should be observed that the heat transfer circuit 29 may optionally include one or more flow rate regulator members 31 (only one member is shown in dashed lines) for acting on the refrigerant, in order to adapt the heat exchange power of the first heat exchanger system 25 to the needs of the rotary electrical machines 9.

In addition, the heat transfer circuit 29 may optionally include at least one additional heat exchanger 33 (shown in dashed lines) associated with an auxiliary heat source 35 (shown in dashed lines), possibly constituted by a water circuit, electrical heaters, or a source of steam, for example.

Including the additional heat exchanger 33 in the heat transfer circuit 29 serves to vaporize and heat the natural gas vapor 1b and the liquid natural gas passing through the first and second heating heat exchangers 15a and 15b even when the heat collected by the first heat exchanger system 25 from the cooler device 11 for cooling the rotary electrical machines 9 is not sufficient for this purpose.

Furthermore, the cooler device 11 may include an air-conditioner unit 37. In order to improve, amongst other things, the flexibility with which the temperature of the rotary electrical machines 9 can be regulated, the heat sink made available via the first heat exchanger system 25 need not be used directly by those machines, but instead via the air-conditioner unit 37.

The energy system can thus be applied to a system for producing electricity, in particular in off-shore gas terminals using liquefied natural gas 1a or natural gas vapor 1b for providing their energy requirements. Under such circumstances, the rotary electrical machines 9 are constituted mainly by generators or alternators 9a for producing electricity.

FIG. 3 is highly diagrammatic and shows a regasification terminal comprising an energy system of the invention and making use of natural gas stored in liquid form 1a in one or more tanks 3 for feeding to a gas pipeline 30. It should be observed that elements in this figure that are identical to elements in FIGS. 1 and 2 are given the same references.

Depending on the requirements for feeding the pipeline 30 with high-pressure gas, the liquefied gas 1a contained in the tank 3 is transferred by the pump 23 immersed in this tank 3 to a high-pressure pump 24 that delivers the liquefied gas 1a to the heater device 15 (in this case corresponding to a regasification device) in order to ensure that it is regasified before being sent substantially at ambient temperature to the pipeline 30.

In identical manner and in accordance with the invention, the first heat exchanger system 25 is coupled to the second heat exchanger system 27 so as to enable heat to be transferred from the cooler device 11 to the heater device 15.

Thus, the heat sink provided by the heater device 15 for regasifying the liquefied natural gas 1a stored in the tank 3 is used to cool the rotary electrical machines 9 via the first and second heat exchangers 25 and 27.

It should be observed that the engines 7 in the thermoelectric power units 5 of the terminal may optionally be fed with liquefied natural gas 1a and/or natural gas vapor 1b stored in the tank 3, using a circuit that is not shown in the drawing for simplification purposes.

The energy system may also be applied to ships making use of natural gas stored in liquefied form as fuel. In particular, the system can be applied to methane tankers serving to transport liquefied natural gas.

Figure 4:
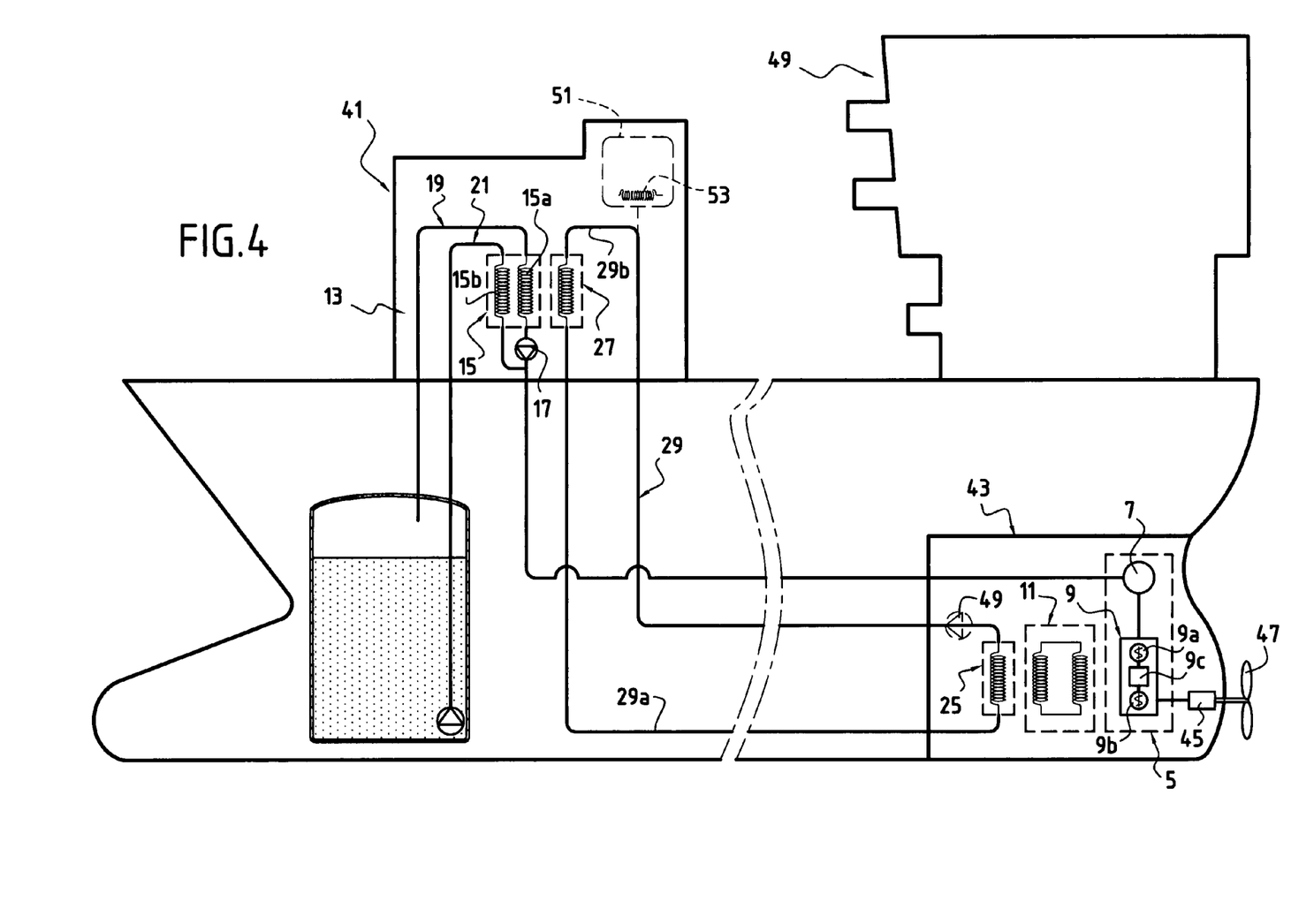
FIG. 4 is a highly diagrammatic view of an electrically-propelled methane tanker ship including a heat exchanger system as shown in FIG. 2.

FIG. 4 is a highly diagrammatic view of an electrically-propelled methane tanker using natural gas as its fuel stored in liquid form.

The methane tanker comprises an energy system of the kind shown in FIG. 2 and only a few elements thereof are shown in order to simplify this figure. However, the architecture of this energy system needs to take account of constraints associated with being installed on board the methane tanker ship.

The various pieces of equipment making up the energy system are then located in two different places on board the ship, essentially for safety reasons.

The gas feed equipment 13 is installed in the cargo area 41 of the ship. In contrast, the thermoelectric power units 5 propelling the ship are installed in the machine room area 43.

Thus, the cargo area 41 contains most of the auxiliary equipment needed for monitoring the cargo and for using it as fuel in the propulsion system of the ship, in particular for monitoring the pressure in the tanks 3, for heating the natural gas vapor 1b taken therefrom by the first circuit 19, and for heating it in the heater device 15 and pressurizing it in the compressor 17, and for vaporizing and heating the liquefied natural gas 1a by means of the heater device 15 for use as additional fuel and taken by the second circuit 21.

Furthermore, the machine room area 43 contains, amongst other things, the engines 7, the alternators 9a, the power electronics 9c, and the electric propulsion motors 9a acting directly, or via a coupler, or a speed-reducing gearbox 45 to drive one or more propellers 47.

Safety standards require the cargo area 41, which is considered as being dangerous, to be on the deck of the ship and at a determined safety distance from the super-structure 49 of the ship, and they also require the number of dangerous pieces of equipment in the machine room 43 to be minimized, since the machine room is more difficult to ventilate given that it is located a least in part below the waterline.

As a result, in a methane tanker, the heat transfer circuit 29 between the cargo area 41 and the rotary electrical machines 9 placed in the machine room 43 needs to cover both a distance and a difference in level that are large. For example, the distance between the cargo area 41 and the machine room 43 situated under the super-structure 49 of the ship is about 100 meters (m), and the difference in level between the cargo area 41 and the machine room 43 is about 30 m.

Consequently, the head losses in the ducts 29a and 29b of the heat transfer circuit 29 can be large. This can justify installing a pump 49 (shown in dashed lines) in the heat transfer circuit 29 in order to overcome the head losses in the circuit.

Nevertheless, the difference in level between the cargo area 41 and the machine room 43 can be put to use for causing the refrigerant to circulate merely under gravity, taking advantage of the difference in fluid density between the cold duct 29a and the hot duct 29b, with this being particularly true when the refrigerant enables the second heat exchanger system 27 to be operated as a condenser and the first heat exchanger system 25 as an evaporator. The cold duct 29a is then filled with liquid, while the hot duct 29b is filled with gas.

This applies, for example, if the refrigerant is selected to be argon at a pressure of about 2 megapascals (MPa), it being understood that the liquefaction temperature of argon at that pressure is −140° C.

In the second heat exchanger system 27, the argon can be cooled, and then liquefied by coming into contact with the cold natural gas vapor 1b at a temperature of about −30° C. via the heating heat exchanger 15a, and by coming into contact with the liquefied natural gas 1a at a temperature of −160° C. via the second heating heat exchanger 15b.

Under such circumstances, the hydrostatic pressure in the liquid column at the bottom of the cold duct 29a is then about 0.3 MPa. For example, when the temperature of the argon at the outlet from the first heat exchanger system 25 is about 0° C., and the hot duct 29b is full of gas, the corresponding hydrostatic pressure is about 0.03 MPa. This pressure difference between the two branches of the heat transfer circuit 29 can thus be used for overcoming the head losses in the thermal circuit 29 without it being necessary to use the pump 49, thus increasing reliability and reducing the cost of the energy system.

For an argon flow rate of about 3 kilograms per second (kg/s), enabling heat to be transferred at a rate of about 600 kilowatts (kW) between the engine room 43 and the cargo area 41, the head losses are overcome by the hydrostatic pressure difference between the hot duct 29b and the cold duct 29a when the pipes 29a and 29b have respective diameters of 20 centimeters (cm) and 5 cm.

Thus, even if these ducts (in particular the cold duct 29b) need to be lagged using a thickness of several cm of insulating foam, installing them on board the ship between the cargo area 41 and the machine room 43 does not give rise to any particular problem.

When the mean pressure in the heat transfer circuit 29 in normal operation is about 2 MPa, the circuit 29 needs to be dimensioned to accommodate higher pressures (about 5 MPa) when the ship has no gas and the entire circuit 29 is at a temperature close to ambient.

Another solution consists in placing a buffer tank 51 (shown in dashed lines) in the heat transfer circuit 29, e.g. in the cargo area 41, thus making it possible to limit this type of pressure rise. In order to reduce its size, the buffer tank 51 may optionally be lagged and maintained at a temperature below ambient, or even at a cryogenic temperature, by a heat exchanger and evaporator 53 fed with liquefied natural gas 1a, thus enabling argon to be stored in liquid form.

The choice of cooling fluid is not restricted to argon, and other fluids can be envisaged, or indeed mixtures of fluids, in order to improve the heat transfer capacity of the heat transfer circuit 29 or in order to reduce its operating pressure.

In addition to its application to methane tankers, the invention can be applied more generally to any ship using natural gas stored in liquid form as its fuel. In particular, it should be observed that under such circumstances, given that fuel tanks of liquefied natural gas are very small compared with the tanks in a methane tanker, the leakage of heat into the liquefied natural gas is very limited and most of the required fuel is taken in liquid form. For propulsion with the same power, the available heat sink is thus very considerably greater, typically two to three times greater, thereby enabling the rotary electrical machines to operate at even lower temperatures. Under such circumstances, there is no need to use the vapor in the tanks as a heat sink, and consequently it is optionally possible to omit the first circuit for taking gas.

Thus, the energy system of the invention, when applied to a system for producing electricity or to a ship, provides synergy in the use of heat between heating natural gas vapor 1b and/or liquefied natural gas 1a, and cooling the rotary electrical machines 9.

The heat sink provided by the natural gas vapor 1b and/or the liquefied natural gas 1a corresponds to a cooling medium that is colder than the water or the air that is conventionally used for machines having cooling circuits that are respectively closed or open.

Thus, by moving the operating point of the rotary electrical machines 9 towards lower temperatures, smaller losses are generated by the Joule effect. Consequently, the efficiency of such machines increases, enabling the energy consumption of the engines 7 to be reduced and reducing emissions of polluting particles.

It is also possible to envisage to continue using the rotary electrical machines 9 at their operating temperatures as defined by the conventional classes (BV, DNV, ABS, etc.), but with cooling that is more efficient. Under such circumstances, the power per unit weight of the rotary electrical machines 9 is increased, thus enabling them to be made more compact.

What is claimed is:

1. An energy system using as fuel natural gas stored in liquid form in at least one tank containing liquefied natural gas, the system comprising a feeder device provided with a heater device for heating liquefied natural gas and/or natural gas vapor, and making use of a thermoelectric power unit including rotary electrical machines, the system comprising a first heat exchanger system associated with a cooler device for cooling the rotary electrical machines, and a second heat exchanger system associated with the heater device, the first heat exchanger system being coupled to the second heat exchanger in order to enable heat to be transferred from the cooler device to the heater device.

2. A system according to claim 1, wherein each of the first and second heat exchanger systems comprises a plurality of heat exchangers.

3. A system according to claim 1, wherein the coupling between the first heat exchanger system and the second heat exchanger system is constituted by at least one heat transfer circuit containing a two-phase refrigerant.

4. A system according to claim 3, wherein the first heat exchanger system is an evaporator system and the second heat exchanger system is a condenser system, such that the refrigerant presents a gas phase in the first heat exchanger system and a liquid phase in the second heat exchanger system, thus causing the refrigerant to circulate in said at least one heat transfer circuit, merely under the effect of gravity.

5. A system according to claim 3, wherein the refrigerant comprises a fluid selected from argon, nitrogen, or any other fluid that is condensable by liquefied natural gas vapor, the fluid being used pure or in the form of a mixture.

6. A system according to claim 3, wherein said at least one heat transfer circuit includes at least one flow rate regulator member.

7. A system according to claim 3, wherein said at least one heat transfer circuit includes at least one additional heat exchanger associated with an auxiliary source of heat.

8. A system according to claim 1, wherein the feeder device comprises a first circuit for taking natural gas vapor that is given off by said at least one tank of liquefied natural gas, said first circuit comprising at least one compressor and at least one first heating heat exchanger associated with the second heat exchanger system.

9. A system according to claim 1, wherein the feeder device further comprises a second circuit for taking liquefied natural gas, the second circuit comprising at least one pump immersed in said at least one tank of liquefied natural gas, and at least one second heating heat exchanger associated with the second heat exchanger system.

10. A system according to claim 1, wherein the cooler device includes an air-conditioning unit.

11. A ship including an energy system according to claim 1, wherein natural gas is used as fuel for the thermoelectric power units for propelling the ship.

12. A ship according to claim 11, wherein the feeder device is installed in a cargo area on the deck of the ship at a determined safety distance from the super-structure of the ship, and wherein the thermoelectric power units is installed in a machine room.

13. A ship according to claim 11, wherein the ship is a methane tanker transporting liquefied natural gas, and using it as fuel.

14. An electricity production system comprises an energy system according to claim 1, wherein the rotary electrical machines comprise alternators for producing electricity.

15. A terminal for regasifying liquefied natural gas to feed a gas pipeline with gas, the terminal being including an electricity production system according to claim 14.

* * * * *